United States Patent Office 2,891,849
Patented June 23, 1959

2,891,849
SOLVENT COMPOSITION

Richard J. Whitbourne, Rochester, N.Y., assignor to Eastman Kodak Company, Rochester, N.Y., a corporation of New Jersey No Drawing. Application November 30, 1956
Serial No. 625,225

6 Claims. (Cl. 41—43)

This invention concerns a new composition of matter, more particularly to a solvent composition for dissolving or etching cellulose acetate.

Halftone relief printing plates may be prepared by using a gelatin relief image as a resist for the action of a solvent on the underlying cellulosic film base. This gelatin relief image may be prepared photographically or mechanically but in either event a carefully compounded solvent is required.

Solvents such as acetone, methyl ethyl ketone, nitromethane, and other highly active solvents seem to swell the entire base including those areas under the gelatin image so that all semblance of dot structure is lost before any appreciable amount of base can be removed from the areas not covered by the gelatin stencil.

On the other hand there are, of course, many organic liquids which are definitely not solvents for cellulose acetate. This would include most alcohols, petroleum and aromatic hydrocarbons, glycols, and the like. There are other organic compounds which are near-solvents such as some of the glycol ethers. However, I have found a solvent composition which yields a substantially better dot structure than other mixtures.

One object of this invention is to provide a novel solvent mixture. Another object is to provide a solvent for cellulose acetate which is particularly applicable to etching a cellulose acetate printing plate. A further object is to provide an etching solvent which is composed of relatively inexpensive components. An additional object is to provide an etching solvent which is easy to compound. Another object is to provide an etching compound which may be used on either cellulose acetate or cellulose acetate butyrate.

Example 1

A halftone relief printing plate was made as follows:

A continuous tone camera negative was enlarged onto high contrast photographic sensitized paper through a 65-line contact screen for photoengraving. This print was processed to a halftone using normal developer and fixing baths, washed and dried.

This halftone paper print was placed over a sheet of high contrast "lith" type film having a cellulose acetate butyrate base, with the emulsion of the paper in contact with the emulsion of the film on a vacuum board and exposed to a 30-second exposure to a 25-watt lamp at a distance of six feet. The film was developed by standard procedures. Following the developing step, the film was put into a stop bath and then bleached (the film was agitated until bleaching became apparent and then the surface of the film was swabbed uniformly with a cotton pad until the silver image had disappeared completely). The bleached film was then washed and redeveloped in the light, using a paper print developer, rinsed in a stop bath, and passed through the remaining customary steps of photographic processing such as washing and drying. Although fixing is not required, the film was immersed in a fixing bath prior to washing as a convenient manner of reducing the swelling of the residue gelatin.

The processed film was mounted on a suitable holder and an etching solvent comprising one part by volume dimethyl sulfoxide and three parts isopropyl alcohol was used to swab the film. This was done by swabbing the film surface with a nylon-velvet-covered pad containing the etching solvent using a vigorous circular motion for two and one half minutes. At the end of the etching period, the film was neutralized using isopropyl alcohol and the film dried. This film was then mounted with double-sided Scotch tape on a type-high wooden block and used as a relief plate to make high quality halftone prints.

I have found that a solvent composition having one part by volume dimethyl sulfoxide and 3–4 parts isopropyl alcohol yields a substantially better dot structure than other mixtures. The proportions of this mixture are relatively critical inasmuch as increasing the amount of sulfoxide to the ratio of 1:2.5 or more results in too vigorous an attack on the film base with the result of undercutting of dots and loss of highlights. Decreasing the sulfoxide to the ratio 1:5 results in a loss of solvent properties, indicating that the proportions are fairly critical.

A particular advantage of my solvent mixture is that it is relatively inexpensive and both components are fairly readily obtainable in relatively pure form. The components are nontoxic and the solvent mixture is reasonably free from objectionable odor. The mixture is not likely to deteriorate on keeping, providing it is kept in a stoppered bottle. Furthermore, it is not highly volatile and, while inflammable, does not particularly present an explosion hazard.

I claim:

1. A solvent mixture comprising substantially one part by volume dimethyl sulfoxide and 3–4 parts by volume isopropyl alcohol.

2. A process for the preparation of a cellulose ester relief printing plate selected from the class consisting of cellulose acetate and cellulose acetate butyrate comprising etching the cellulose ester with an etching solvent comprising substantially one part by volume dimethyl sulfoxide and 3–4 parts by volume isopropyl alcohol.

3. A process for the preparation of a cellulose acetate relief printing plate covered by a gelatin stencil comprising etching the cellulose acetate with an etching solvent comprising substantially one part by volume dimethyl sulfoxide and 3–4 parts by volume isopropyl alcohol.

4. A method of producing a cellulose acetate halftone relief printing plate using a photographic gelatin relief image as a resist, comprising using a solvent consisting substantially of 3–4 parts by volume isopropyl alcohol and one part by volume dimethyl sulfoxide to etch the underlying cellulosic film base.

5. A process for the preparation of a cellulose acetate butyrate relief printing plate covered by a gelatin stencil comprising etching the cellulose acetate with an etching solvent comprising substantially one part by volume dimethyl sulfoxide and 3–4 parts by volume isopropyl alcohol.

6. A method of producing a cellulose acetate butyrate halftone relief printing plate using a photographic gelatin relief image as a resist, comprising using a solvent consisting substantially of 3–4 parts by volume isopropyl alcohol and one part by volume dimethyl sulfoxide to etch the underlying cellulosic film base.

References Cited in the file of this patent

UNITED STATES PATENTS

| | | |
|---|---|---|
| 2,167,909 | Rooney et al. | Aug. 1, 1939 |
| 2,366,788 | Horback | Jan. 9, 1945 |
| 2,753,337 | Klug | July 3, 1956 |

OTHER REFERENCES

Mellan: Industrial Solvents; copyright 1939 by Reinhold Publishing Corp., New York; page 432.